United States Patent
Cho et al.

(10) Patent No.: US 9,674,049 B2
(45) Date of Patent: ***Jun. 6, 2017

(54) METHOD AND APPARATUS FOR PROVIDING REMOTE ACCESS SERVICE

(71) Applicant: Samsung Electronics Co., Ltd., Suwon-si (KR)

(72) Inventors: Seong-ho Cho, Seoul (KR); Se-hee Han, Seoul (KR); Je-young Maeng, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/474,896

(22) Filed: Sep. 2, 2014

(65) Prior Publication Data

US 2014/0372613 A1 Dec. 18, 2014

Related U.S. Application Data

(60) Continuation of application No. 13/739,563, filed on Jan. 11, 2013, now Pat. No. 8,862,749, which is a (Continued)

(30) Foreign Application Priority Data

Dec. 8, 2008 (KR) .................. 10-2008-0124291

(51) Int. Cl.
*G06F 15/16* (2006.01)
*H04L 12/24* (2006.01)
(Continued)

(52) U.S. Cl.
CPC .......... *H04L 41/28* (2013.01); *H04L 12/2818* (2013.01); *H04L 29/125* (2013.01);
(Continued)

(58) Field of Classification Search
CPC ... H04L 41/28; H04L 12/2818; H04L 29/125; H04L 29/12509; H04L 61/2564;
(Continued)

(56) References Cited

U.S. PATENT DOCUMENTS 6,542,515 B1 4/2003 Kumar et al.
8,024,429 B2 9/2011 Cagenius
(Continued)

FOREIGN PATENT DOCUMENTS

KR 10-2004-0005464 A 1/2004
KR 10-2007-0018196 A 2/2007
(Continued)

OTHER PUBLICATIONS

European Office Action issued on Feb. 18, 2013 in counterpart European Application No. 09 160 612.9 (9 pages).
(Continued)

*Primary Examiner* — Viet Vu
(74) *Attorney, Agent, or Firm* — NSIP Law

(57) ABSTRACT

A remote access service is provided by receiving remote access transport agent (RATA) capability information of a home remote access server (RAS) and a remote RAS from the home RAS and the remote RAS, respectively, generating a RATA profile based on the RATA capability information, supported by the home RAS and the remote RAS, and transmitting the generated RATA profile to the home RAS and the remote RAS, respectively.

14 Claims, 11 Drawing Sheets

Related U.S. Application Data division of application No. 12/465,679, filed on May 14, 2009, now Pat. No. 8,375,104.

(60) Provisional application No. 61/071,872, filed on May 22, 2008.

(51) Int. Cl.

| | | |
|---|---|---|
| *H04L 29/12* | (2006.01) | |
| *H04L 29/08* | (2006.01) | |
| *H04L 29/06* | (2006.01) | |
| *H04W 76/02* | (2009.01) | |
| *H04L 12/28* | (2006.01) | |
| *G06F 9/44* | (2006.01) | |

(52) U.S. Cl.
CPC .... *H04L 29/12509* (2013.01); *H04L 61/2564* (2013.01); *H04L 61/2567* (2013.01); *H04L 65/1006* (2013.01); *H04L 67/02* (2013.01); *H04L 67/025* (2013.01); *H04L 67/30* (2013.01); *H04W 76/02* (2013.01); *H04W 76/022* (2013.01); *G06F 9/4445* (2013.01); *H04L 12/2809* (2013.01); *H04L 61/2578* (2013.01)

(58) Field of Classification Search
CPC . H04L 61/2567; H04L 65/1006; H04L 67/02; H04L 67/025; H04L 67/30; H04W 76/02; H04W 76/022; G06F 9/4445
USPC ............... 709/217, 219, 227, 229, 237, 250
See application file for complete search history.

(56) References Cited

U.S. PATENT DOCUMENTS

| | | |
|---|---|---|
| 2006/0031459 A1 | 2/2006 | Ahn et al. |
| 2006/0041688 A1 | 2/2006 | Wright et al. |
| 2006/0274759 A1* | 12/2006 | Maeda ................... H04W 8/08 370/395.52 |
| 2007/0268896 A1 | 11/2007 | Oyama et al. |
| 2007/0286117 A1* | 12/2007 | Balasubramanian et al. ............................ 370/328 |
| 2008/0212495 A1 | 9/2008 | Stirbu |
| 2008/0285471 A1* | 11/2008 | Tegeler ........................ 370/250 |
| 2008/0301216 A1 | 12/2008 | Han |

FOREIGN PATENT DOCUMENTS

| | | |
|---|---|---|
| KR | 10-2007-0076487 A | 7/2007 |
| KR | 10-2007-0091237 A | 9/2007 |
| KR | 10-2008-0105393 A | 12/2008 |
| WO | WO-2009/051310 A | 4/2009 |

OTHER PUBLICATIONS

"Remote Access Architecture for UPnP™ Version 1.0", Contributing Members of the UPnP™ Forum. (2007).

Search Report issued on Dec. 21, 2011 of the European Patent Application No. 09160612.9 (6 pages).

Belimpasakas, Petros et al. "Remote Access to Universal Plug and Play (UPnP) Devices Utiliziing the Atom Publishing Protocol." *Networking and Services, 2007. ICNS. Third International Conference on, IEEE, Pi.* Jun. 1, 2007, (6 pages).

Kim, Jung-Tae et al. "Implementation of the DLNA Proxy System for Sharing Home Media Contents." *IEEE Transactions on Consumer Electronics, IEEE Service Center*, vol. 53, No. 1, Feb. 1, 2007, (6 pages).

European Patent Office Search Report issued on Apr. 5, 2012, in counterpart European Patent Application No. 09160612.9 (12 pages).

Notice of Allowance Issued on Apr. 4, 2014 by the Korean Intellectual Property Office in corresponding Korean Application 10-2008-0124291 (4 pages with English Translation).

\* cited by examiner

METHOD AND APPARATUS FOR PROVIDING REMOTE ACCESS SERVICE

CROSS-REFERENCE TO RELATED APPLICATIONS

This application is a continuation of U.S. patent application Ser. No. 13/739,563, filed on Jan. 11, 2013, now patented as U.S. Pat. No. 8,862,749 issued on Oct. 14, 2014, which is a divisional of U.S. patent application Ser. No. 12/465,679, filed on May 14, 2009 and issued as U.S. Pat. No. 8,375,104, which claims the benefit of U.S. Provisional Application No. 61/071,872, filed on May 22, 2008, and claims the benefit of Korean Patent Application No. 10-2008-0124291, filed on Dec. 8, 2008 in the Korean Intellectual Property Office, the entire disclosures of which are incorporated herein by reference for all purposes.

BACKGROUND

1. Field

The following description relates to a universal plug and play (UPnP) middleware-based home network.

2. Description of the Related Art

Due to the spread of home networking, conventional home networking environments centering on personal computers (PCs) are gradually shifting to home networking environments including electronic equipments using various lower networking technologies. As a result, home network middleware technologies such as universal plug and play (UPnP) are being developed to group such electronic equipments in a unified network by using Internet protocols (IPs).

UPnP technology enables home appliances in a home network to be peer-to-peer networked on the basis of a distributed and open networking structure instead of being under centralized control.

Generally, in home network middleware, a UPnP device models its service with actions and state variables. A UPnP control point (CP) automatically discovers the UPnP device to use the service.

UPnP Device Architecture 1.0, for example, uses distributed and open networking to discover a UPnP device via an IP multicast in a home network. It cannot currently be guaranteed that an IP multicast service is provided across the Internet, and thus controlling the UPnP device using information obtained from the discovery of the UPnP device may be difficult to perform across the Internet.

As a result, UPnP Remote Access Architecture has been developed such that a UPnP device or a CP is operated in a home network as if they exist in the same network even if the UPnP device or the CP physically exists outside the home network. The UPnP Remote Access Architecture defines a remote access server (RAS) existing within a home network and a remote access client (RAC) existing in a remote network.

SUMMARY

In one general aspect, a remote access service is provided by using a management console. The remote access transport agent (RATA) capability information of a home remote access server (RAS) and a remote RAS are received from the home RAS and the remote RAS, respectively, a RATA profile based on the RATA capability information is generated, such RATA profile being supported by the home RAS and the remote RAS, and the generated RATA profile is transmitted to the home RAS and the remote RAS, respectively.

An identifier (ID) of the remote RAS may be transmitted to the home RAS, where the ID of the remote RAS is used for setting a secure authenticated channel (SAC) established to the remote RAS by the home RAS, and the RATA capability information may be received from the home RAS by using a universal plug and play (UPnP) action, and the ID of the remote RAS and the RATA profile may be transmitted to the home RAS by using the UPnP action, and the RATA capability information may be received from the remote RAS on the SAC by using an out-of-band protocol, and the RATA profile may be transmitted to the remote RAS on the SAC by the out-of-band protocol.

The out-of-band protocol may include hypertext transfer protocol (HTTP) and secure-hypertext transfer protocol (S-HTTP).

RATA configuration information including the RATA profile of the remote RAS may be obtained from the home RAS.

The RATA configuration information may be provided to the home RAS via a remote access discovery agent (RADA) Sync service of the remote RAS.

The RATA profile to be transmitted to the home RAS and the remote RAS, respectively, may be updated.

A RATA profile of each of the home RAS and the remote RAS may be received from the home RAS and the remote RAS, respectively, and a message for deleting the received RATA profile may be transmitted to the home RAS and the remote RAS, respectively.

If the management console moves to a remote network, the RATA capability information may be received from the home RAS through remote access by using a UPnP action, and the RATA profile may be transmitted to the home RAS through remote access by using the UPnP action, and the RATA capability information may be received from the remote RAS by using the UPnP action after the remote RAS is discovered, and the RATA profile may be transmitted to the remote RAS by using the UPnP action after the remote RAS is discovered.

If the management console is in a network address translation (NAT)-based private network, an address of a session initiation protocol (SIP) server in which a RAS of the private network subscribes transport address (TA) set information corresponding to candidate Internet protocols (IP) addresses to traverse NAT may be transmitted to the RAS of the private network.

If a relaying service to traverse NAT is provided to the RAS of the private network via a traversal using relays around NAT (TURN) server, an address of the TURN server, which is subscribed to by the RAS of the private network, may be transmitted to the RAS of the private network.

An SIP ID of the remote RAS may be transmitted to the home RAS.

The remote RAS may include a remote remote access client (RAC) or a remote remote access server (RAS).

In another general aspect, a remote access service is provided by using a home remote access server (RAS). A session initiation protocol (SIP) identifier (ID) of a remote RAS is received from a management console, a payload of a SIP packet including a SIP ID of the remote RAS and transport address (TA) set information corresponding to candidate Internet protocols (IP) addresses to access the home RAS is generated, and the SIP packet is transmitted to a SIP server.

The SIP packet including the TA set information corresponding to the candidate IP addresses may be received to access the remote RAS corresponding to the SIP ID of the remote RAS as a payload of the SIP packet, from the SIP server, a payload including TA set information of the remote RAS may be extracted from the SIP packet, and TA set information of the remote RAS may be set.

The TA set information of the home RAS may include a TA, a reflexive TA, and a relaying TA, and the TA may include a pair of an IP address allocated to the home RAS and a port number of a service to access, the reflexive TA may include, when the home RAS is in a network address translation (NAT)-based private network, a pair of a public IP address allocated to the private network and a port number of a service to access. The relaying TA may include, when the home RAS is in a NAT-based private network and packets destined for the private network are relayed by a traversal using relays around NAT (TURN) server, a pair of a public IP address allocated to the TURN server and a port number of a service to access.

The TA set information of the remote RAS may include a TA, a reflexive TA, and a relaying TA, and the TA may include a pair of an IP address allocated to the remote RAS and a port number of a service to access. The reflexive TA may include, when the remote RAS is in a NAT-based private network, a pair of a public IP address allocated to the private network and a port number of a service to access, and the relaying TA may include, when the remote RAS is in a NAT-based private network and packets destined for the private network are relayed by a TURN server, a pair of a public IP address allocated to the TURN server and a port number of a service to access.

TA set information corresponding to the candidate IP addresses may be generated to access the home RAS.

The payload of the SIP packet may be in a form of extensible markup language (XML) or session description protocol (SDP).

The remote RAS may include a remote remote access client (RAC) or a remote RAS.

In another general aspect, a management console includes a remote access transport agent (RATA) capability information receiving unit receiving RATA capability information of a home remote access server (RAS) and a remote RAS from the home RAS and the remote RAS respectively, a RATA profile generating unit generating a RATA profile based on the RATA capability information, supported by the home RAS and the remote RAS, and a RATA profile transmitting unit transmitting the generated RATA profile to the home RAS and the remote RAS, respectively.

In another aspect, a home remote access server (RAS), includes an identifier (ID) receiving unit receiving a session initiation protocol (SIP) ID of a remote RAS from a management console, a SIP payload generating unit generating a payload of a SIP packet including a SIP ID of the remote RAS and transport address (TA) set information corresponding to candidate Internet protocols (IP) addresses to access the home RAS, and a SIP packet transmitting unit transmitting the SIP packet to a SIP server.

Other features and aspects will be apparent from the following detailed description, the drawings, and the claims.

Figure 1:
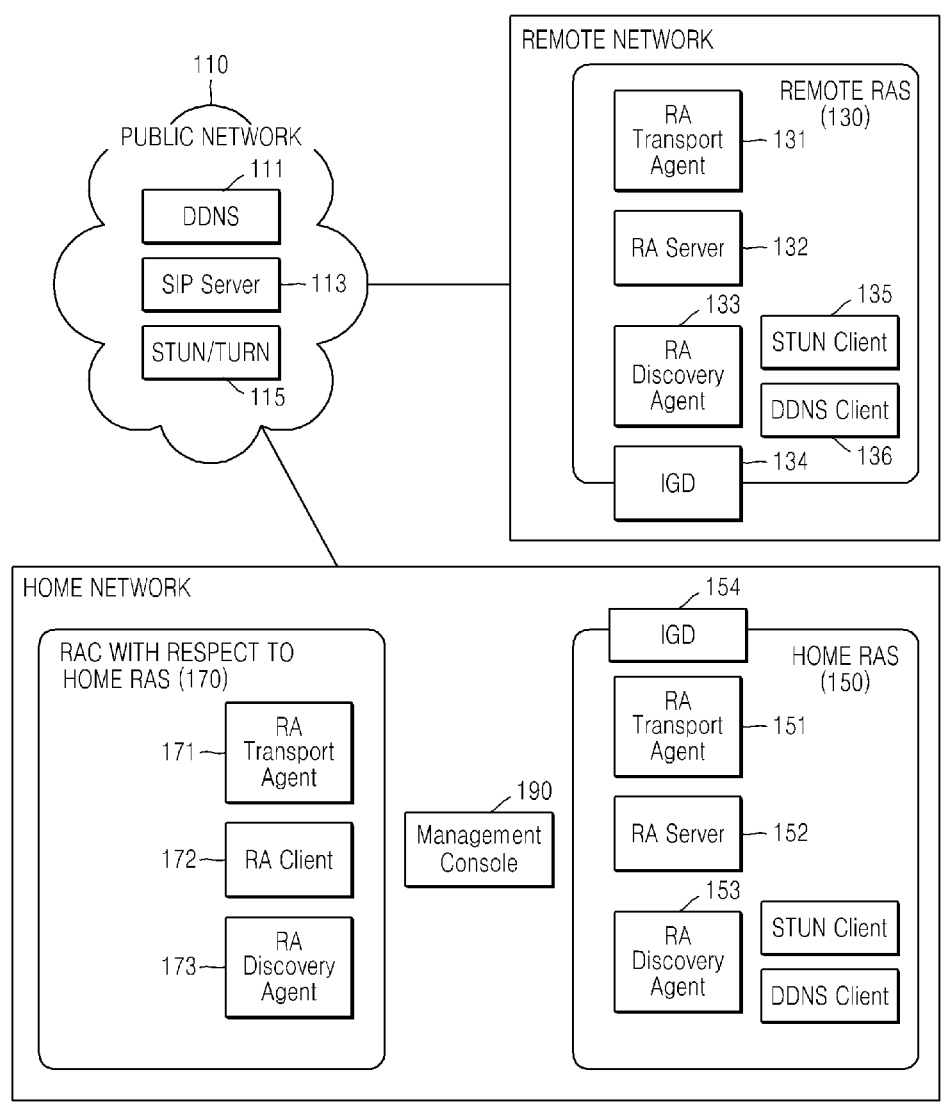
FIG. 1 is a block diagram illustrating an exemplary architecture providing a home-to-home remote access service between a remote remote access server (RAS) and a home RAS.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the media, methods, apparatuses, and systems described herein. Accordingly, various changes, modifications, and equivalents of the media, methods, apparatuses, and systems described herein will be suggested to those of ordinary skill in the art. Also, descriptions of well-known functions and structures may be omitted for increased clarity and conciseness.

FIG. 1 shows an exemplary architecture providing a home-to-home remote access service between a remote remote access server (RAS) 130 and a home RAS 150.

Referring to FIG. 1, the home RAS 150 is a universal plug and play (UPnP) device existing within a home network, and the remote RAS 130 is a UPnP device existing within a remote network. The home RAS 150 is a logical device supporting a remote access service, and may be either a device physically identical to an internet gateway device (IGD) or a device different from the IGD. A management console 190 is a device for setting configuration information related to remote access and controlling the remote access service. In other words, the management console 190 is a UPnP control point (CP) for controlling the remote access service. The management console 190 according to an exemplary embodiment may be included in the home RAS 150 or may be a device separate from the home RAS 150. New UPnP actions and state variables may be defined in, for example, the home RAS 150, the remote RAS 130, and the management console 190.

The home RAS 150 and the remote RAS 130 synchronize device list information, discovered in networks of each of the home RAS 150 and the remote RAS 130, via a remote access transport channel (RATC) therebetween. Thus, the remote RAS 130 can discover UPnP devices within the home network. Then, the home RAS 150 forwards a message for controlling a device, received by the remote RAS 130 via the RATC, to a UPnP device corresponding to the message.

The management console 190 provides parameters, which are used for setting the RATC between the home RAS 150 and the remote RAS 130, in the form of remote access transport agent (RATA) profiles. The management console 190 matches information regarding protocols to be used by RATAs 151 and 131 of the home RAS 150 and the remote RAS 130 and capability information, and generates a RATA profile for each of the home RAS 150 and the remote RAS 130 based on the matched information.

The home RAS 150 and the remote RAS 130 set the RATA profile within themselves, so that the RATC can be set up between the home RAS 150 and the remote RAS 130 later.

If the home RAS 150 and the remote RAS 130 exist in the same network, the management control 190 may set up the RATA profile dynamically according to, for example, UPnP Device Architecture 1.0. Nevertheless, the remote RAS 130 and the home RAS 150 supporting home-to-home remote access need not exist in the same network or move to the remote network.

Thus, the management console 190 may generate and transmit the RATA profile in order to be remotely accessed by the home RAS 150 and the remote RAS 130 and may support an out-of-band protocol by which the RATA profile can be transmitted to the remote RAS 130.

If the remote RAS 130 is in a network address translation (NAT) based private network, the remote RAS 130 provides a NAT traversing address to the home RAS 150 via a session initiation protocol (SIP) server 113 in order to be accessed by the home RAS 150. To this end, in the remote RAS 130, an address of the SIP server 113 to which the NAT traversing address of the remote RAS 130 has been subscribed, is subscribed to by a management console of a network to which the remote RAS 130 belongs. In addition, if the remote RAS 130 receives a NAT traversing service from a traversal using relays around NAT (TURN) server, an address of a TURN server corresponding to the NAT traversing service is subscribed to by a management console of a network to which the remote RAS 130 belongs.

A transport address (TA) set is a set of addresses, each of which can be a candidate for an address to traverse the NAT. The addresses in the TA set are pairs of <IP address>:<Port Number>. Three types of TA, including a TA, a reflexive TA, and a relaying TA, may be used. A TA set is a group of independent TAs.

A TA includes a pair of an IP address allocated to a UPnP device and a port number of a service to access. A reflexive TA includes, when the remote RAS 130 is in a NAT-based private network, a pair of a public IP address allocated to the network and a port number allocated to either a terminal or a service to access. A reflexive TA may be obtained from a response to an inquiry to a simple traversal of User Datagram Protocol (UDP) through NATs (STUN) server. A relaying TA includes, when the remote RAS 130 is in a NAT-based private network and packets destined for the private network are relayed by the TURN server, a pair of a public IP address allocated to the TURN server and a port number of a service to access. Since a method of forming a TA set in each device is defined in standard specification of the STUN and the TURN, further descriptions thereof will be omitted for conciseness.

The home RAS 150 transmits a SIP invite message to the SIP server 113 and receives a SIP response message from the SIP server 113 in response to the SIP invite message, so as to obtain the NAT traversing address of the remote RAS 130. The SIP response message includes the NAT traversing address of the remote RAS 130.

Meanwhile, when the home RAS 150 is also in a NAT-based private network, the home RAS 150 loads its NAT traversing address into the SIP invite message to transmit the NAT traversing address to the SIP server 113. Further descriptions thereof will be provided with reference to FIGS. 7 through 9.

A method of generating and transmitting a RATA profile in order to be remotely accessed by the home RAS 150 and the RAC 170 to provide a home-to-remote access client (RAC) remote access service between the home RAS 150 and a RAC 170 by using the management console 190, and a method of traversing NAT to provide a remote access service when the RAC 170 is in a NAT-based private network may be identical to a method of providing the home-to-home remote access service between the home RAS 150 and the remote RAS 130. Thus, further descriptions of a method of providing home-to-RAC remote access service will be omitted for conciseness.

A home network and a remote network are home-to-home remotely accessed and unified as one network via a virtual private network (VPN) tunnel and thus, a UPnP service may be provided via the unified network. In this case, in the remote RAS 130 in the remote network and the RAC 170, the RATA profile may be dynamically set up by the management console 190 in order to be home-to-home and home-to-RAC remotely accessed.

In addition, a plurality of UPnP devices, provided by the RAC 170 and the remote RAS 130, may remotely access each other. Thus, various user scenarios that are three-box model based and are constituted between the home network provided by the home RAS 150, a first remote network provided by the RAC 170 and a second remote network provided by the remote RAS 130 may be supported.

Also, even if the home RAS 150, the RAC 170 or the remote RAS 130 are in a NAT-based private network, the NAT traversing address is provided to each other by using a SIP so that the remote access service traversing the NAT may be provided.

Figure 2:
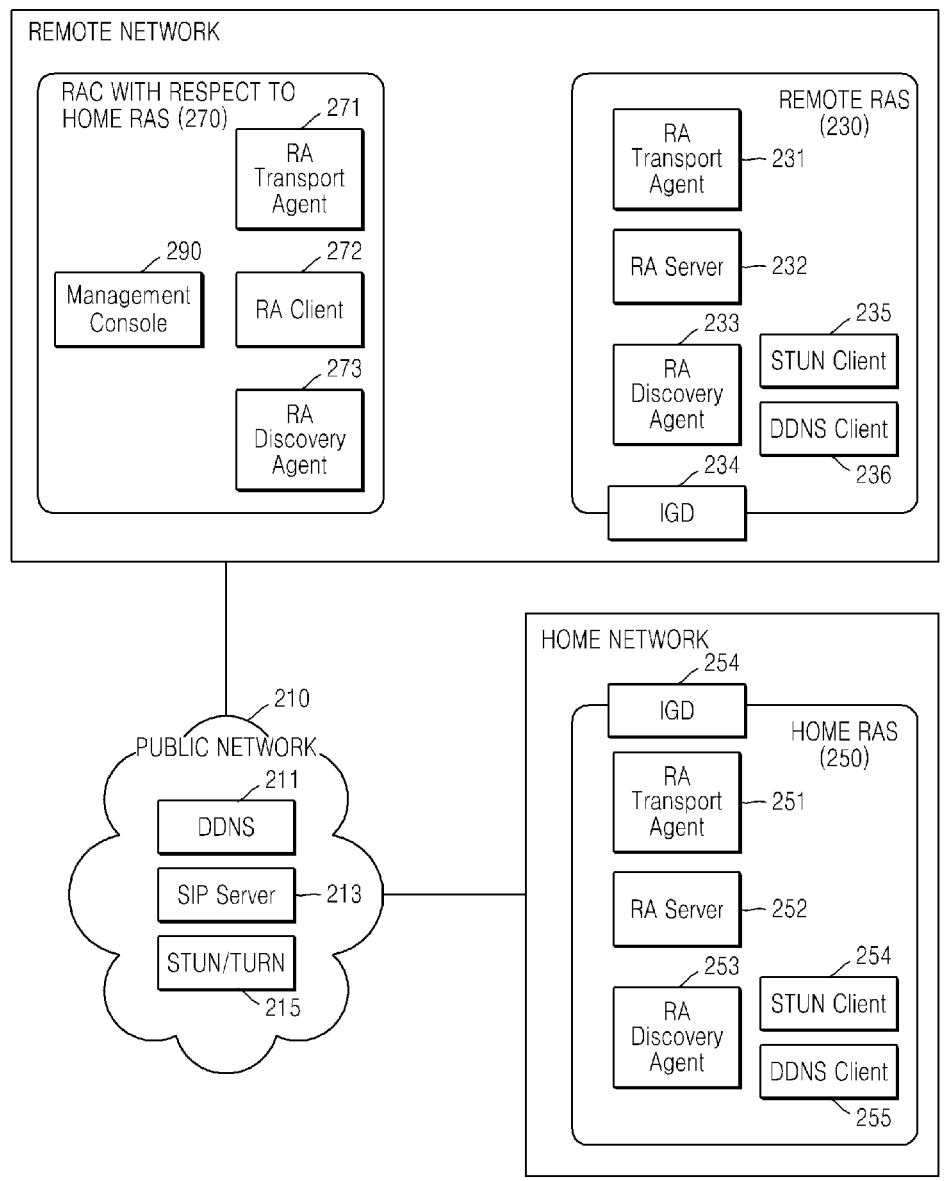
FIG. 2 is a block diagram illustrating an exemplary architecture providing a home-to-home remote access service between a remote RAS and a home RAS by using a management console within a moving remote access client (RAC) that remotely accesses to the home RAS.

FIG. 2 shows an exemplary architecture providing a home-to-home remote access service between a remote RAS 230 and a home RAS 250 by using a management console 290 within a moving RAC 270 that remotely accesses to the home RAS 250.

Referring to FIG. 2, when the management console 290 exists within the moving RAC 270 that remotely accesses to the home RAS 250, the management console 290 provides parameters, which are required for setting an RATC between the remote RAS 230 and the home RAS 250, in the form of a RATA profile.

The management console 290 may discover the home RAS 250 through remote access and then may transmit the RATA profile to the home RAS 250 by using UPnP remote access (RA) actions. Also, the management console 290 may discover the remote RAS 230 by using UPnP device architecture (DA) and transmit the RATA profile to the remote RAS 230 by using UPnP RA actions. Further descriptions thereof will be provided with reference to FIG. 6.

A home network and a remote network are home-to-home remotely accessed and unified as one network via a VPN tunnel and thus, a UPnP service may be provided in the unified network. In this case, in the remote RAS 230 in the remote network, a RATA profile may be dynamically set up by the management console 290 within the moving RAC 270 that remotely accesses to the home RAS 250 in order to be home-to-home remotely accessed. An additional out-of-band protocol may not be required to transmit the RATA profile to the remote RAS 230.

Figure 3:
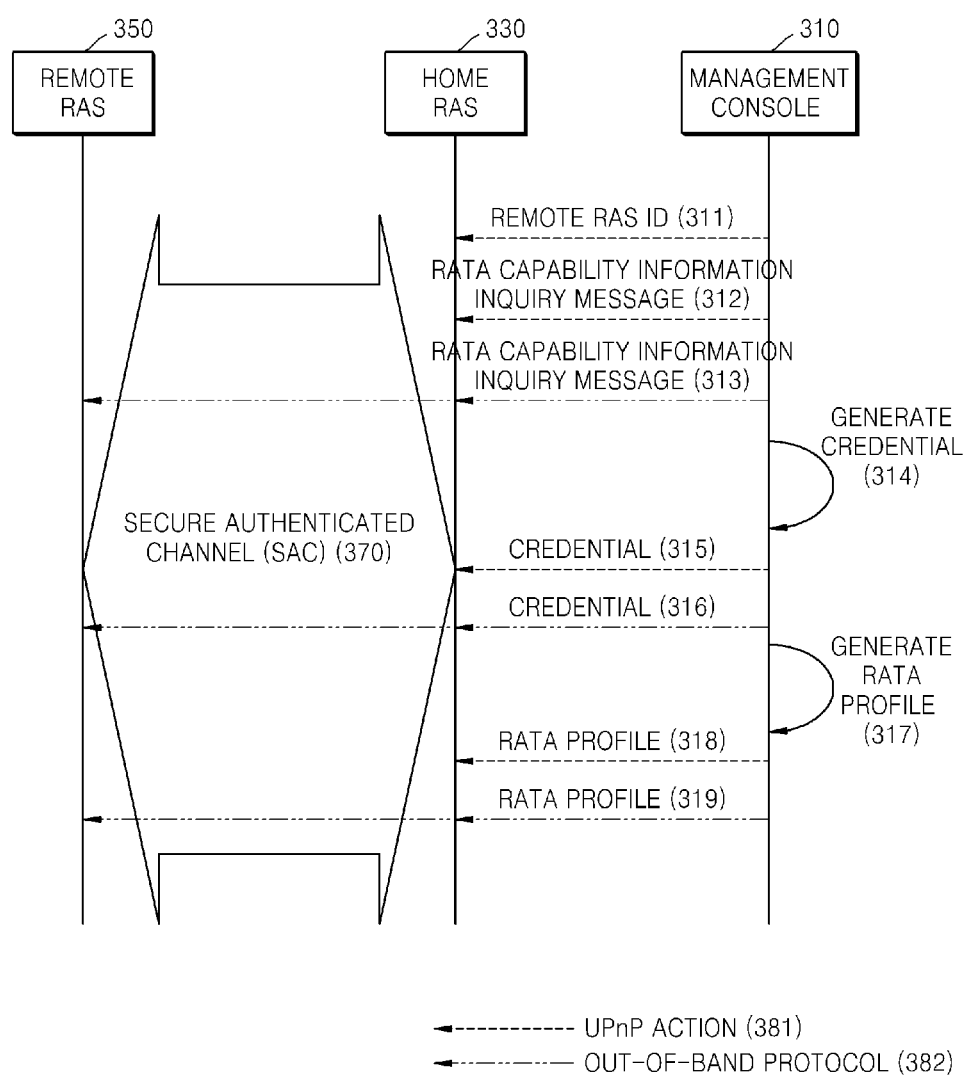
FIG. 3 is a diagram showing an exemplary process of transmitting a remote access transport agent (RATA) profile in order to provide a home-to-home remote access service.

FIG. 3 is a diagram showing an exemplary process of transmitting a RATA profile in order to provide a home-to-home remote access service.

In operation 311, an identifier (ID) of the remote RAS 350 is input to a home RAS 330 by using a management console 310. It is assumed that the identifier of the remote RAS 350 is known to be secure by using an additional method, for example, through a telephone call. The ID of the remote RAS 350 may be a product identification number (PIN) which is an identifier allocated to the remote RAS 350 when the remote RAS is manufactured, or another identifier allocated in another manner may be used.

In operation 370, the home RAS 330 sets a temporary secure authenticated channel (SAC) 370 with the remote RAS 350 by using the ID of the remote RAS 350 and SIP ID information. The SAC may be set by using a transport layer security (TLS) protocol that is implemented by using a pre-shared key. In other implementations, the SAC is set by using another method. The TLS protocol is defined in RFC 4346 and thus, further descriptions thereof will be omitted for conciseness.

The management console 310 receives information, used for setting a VPN, from the remote RAS 350 via the temporary SAC 370 and transmits a generated credential and a RATA profile to the remote RAS 350 via the temporary SAC 370. In this case, information may be transmitted to or received from the SAC 370 by using an out-of-band protocol such as hypertext transfer protocol (HTTP) and secure-hypertext transfer protocol (S-HTTP). In other implementations, a protocol other than an out-of-band protocol may be used.

Meanwhile, the management console 310 discovers the home RAS 330 and then receives information, used for setting a VPN, from the home RAS 330 via a UPnP RA action and transmits the generated credential and the RATA profile to the home RAS 330 via the UPnP RA action.

In operations 312 and 313, the management console 310 transmits a message regarding an inquiry to RATA capability information about each of the home RAS 330 and the remote RAS 350, to the home RAS 330 and the remote RAS 350, respectively, and receives the RATA capability information from each of the home RAS 330 and the remote RAS 350.

In operation 314, the management console 310 generates a credential based on the RATA capability information, supported by the home RAS 330 and the remote RAS 350.

In operations 315 and 316, the management console 310 transmits the credential to each of the home RAS 330 and the remote RAS 350.

In operation 317, the management console 310 generates a RATA profile to be remotely accessed, based on the credential.

In operations 318 and 319, the management console 310 transmits the RATA profile to each of the home RAS 330 and the remote RAS 350.

Figure 4:
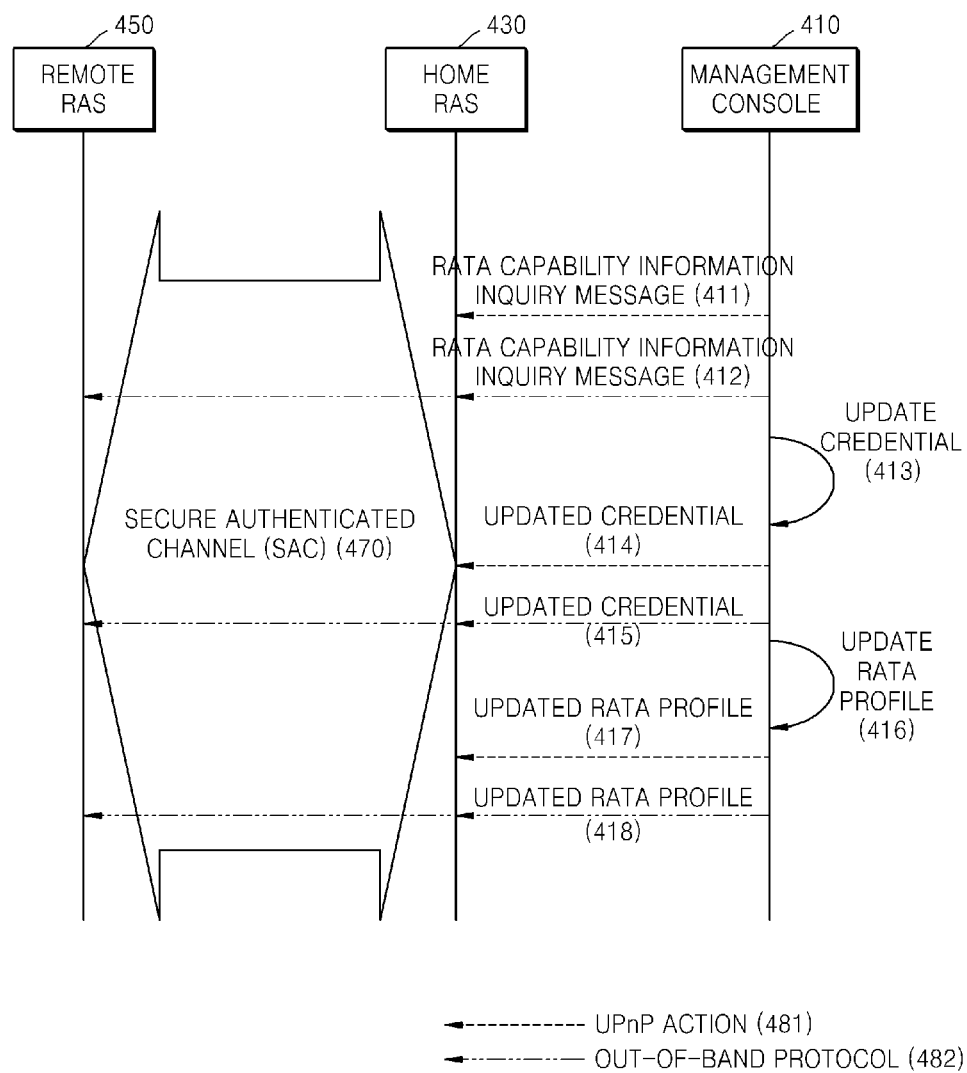
FIG. 4 is a diagram showing an exemplary process of updating a RATA profile in order to provide a home-to-home remote access service.

FIG. 4 is a diagram showing an exemplary process of updating a RATA profile in order to provide a home-to-home remote access service.

In RA Architecture 1.0, RATA Config Service information is not provided to the home RAS 430 via a VPN. Rather, the RATA Config Service information is provided to the home RAS 430 via a remote access discovery agent (RADA) Sync service so as to provide the home-to-home remote access service so that a management console 410 of the home RAS 430 can update or delete an existing RATA profile by using a UPnP action. In this case, the information of RATA Config Service may be limited to be provided only if necessary, by using filtering using a white list or a black list.

In operations 411 and 412, the management console 410 transmits a message regarding an inquiry about RATA capability information about each of the home RAS 430 and the remote RAS 450 to the home RAS 430 and the remote RAS 450, respectively, and receives the RATA capability information from the home RAS 430 and the remote RAS 450.

In operation 413, the management console 410 updates the credential based on the RATA capability information that are supported by the home RAS 430 and the remote RAS 450.

In operations 414 and 415, the management console 410 transmits the updated credential to each of the home RAS 430 and the remote RAS 450.

In operation 416, the management console 410 updates a RATA profile to be remotely accessed, based on the updated credential.

In operations 417 and 418, the management console 410 transmits the updated RATA profile to each of the home RAS 430 and the remote RAS 450.

Figure 5:
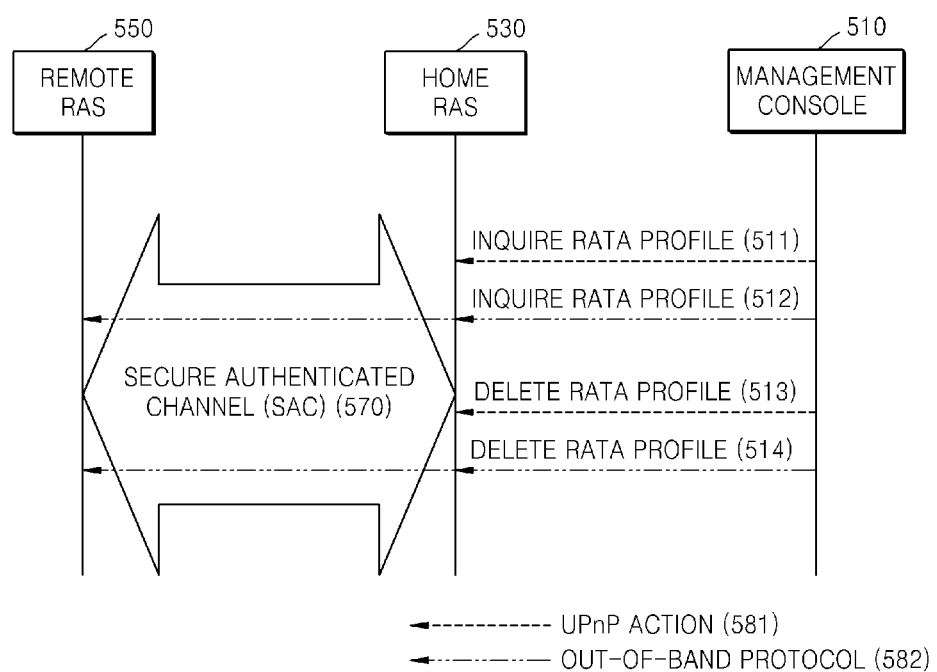
FIG. 5 is a diagram showing an exemplary process of deleting a RATA profile in order to provide a home-to-home remote access service.

FIG. 5 is a diagram showing an exemplary process of deleting a RATA profile in order to provide a home-to-home remote access service.

In operations 511 and 512, a management console 510 transmits a message regarding an inquiry to a RATA profile about each of the home RAS 530 and the remote RAS 550 to the home RAS 530 and the remote RAS 550, respectively, and receives the RATA profile from the home RAS 530 and the remote RAS 550, respectively.

In operations 513 and 514, the management console 510 transmits a message for deleting the RATA profile about each of the home RAS 530 and the remote RAS 550 to the home RAS 530 and the remote RAS 550, respectively.

Figure 6:
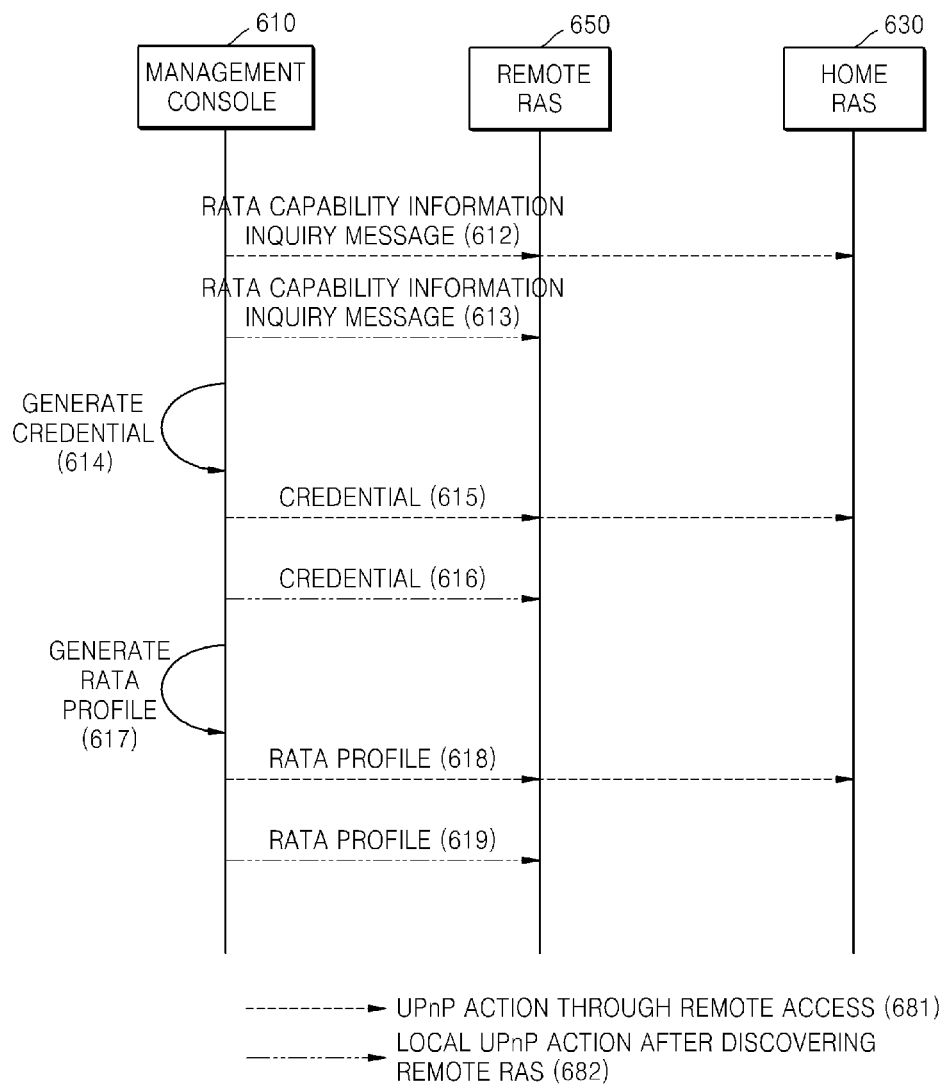
FIG. 6 is a diagram showing an exemplary process of transmitting a RATA profile by using a management console within a moving RAC that remotely accesses to the home RAS, in order to provide a home-to-home remote access service.

FIG. 6 is a diagram showing an exemplary process of transmitting a RATA profile by using a management console 610 within a moving RAC (not shown) that remotely accesses to a home RAS 630, in order to provide a home-to-home remote access service.

When the management console 610 exists within the removing RAC (not shown) that remotely accesses to the home RAS 630, the management console 610 provides parameters, which are required for setting an RATC between the home RAS 630 and a remote RAS 650, in the form of a RATA profile.

The management console 610 discovers the home RAS 630 through remote access and then transmits the RATA profile to the home RAS 630 via a UPnP RA action (operation 681). In addition, since the management console 610 and the remote RAS 650 exist in the same network, the management console 610 discovers the remote RAS 650 via UPnP DA and transmits the RATA profile to the remote RAS 650 via the UPnP RA action (operation 682). Thus, an additional out-of-band protocol may not be required to transmit the RATA profile to the remote RAS 650.

In operations 612 and 613, the management console 610 transmits a message regarding an inquiry about RATA capability information about each of the home RAS 630 and the remote RAS 650 to the home RAS 630 and the remote RAS 650, respectively, and receives the RATA capability information from each of the home RAS 630 and the remote RAS 650.

In operation 614, the management console 610 generates a credential based on the RATA capability information that is supported by the home RAS 630 and the remote RAS 650.

In operations 615 and 616, the management console 610 transmits the credential to each of the home RAS 630 and the remote RAS 650.

In operation 617, the management console 610 generates a RATA profile to be remotely accessed, based on the credential.

In operations 618 and 619, the management console 610 transmits the RATA profile to each of the home RAS 630 and the remote RAS 650.

Figure 7:
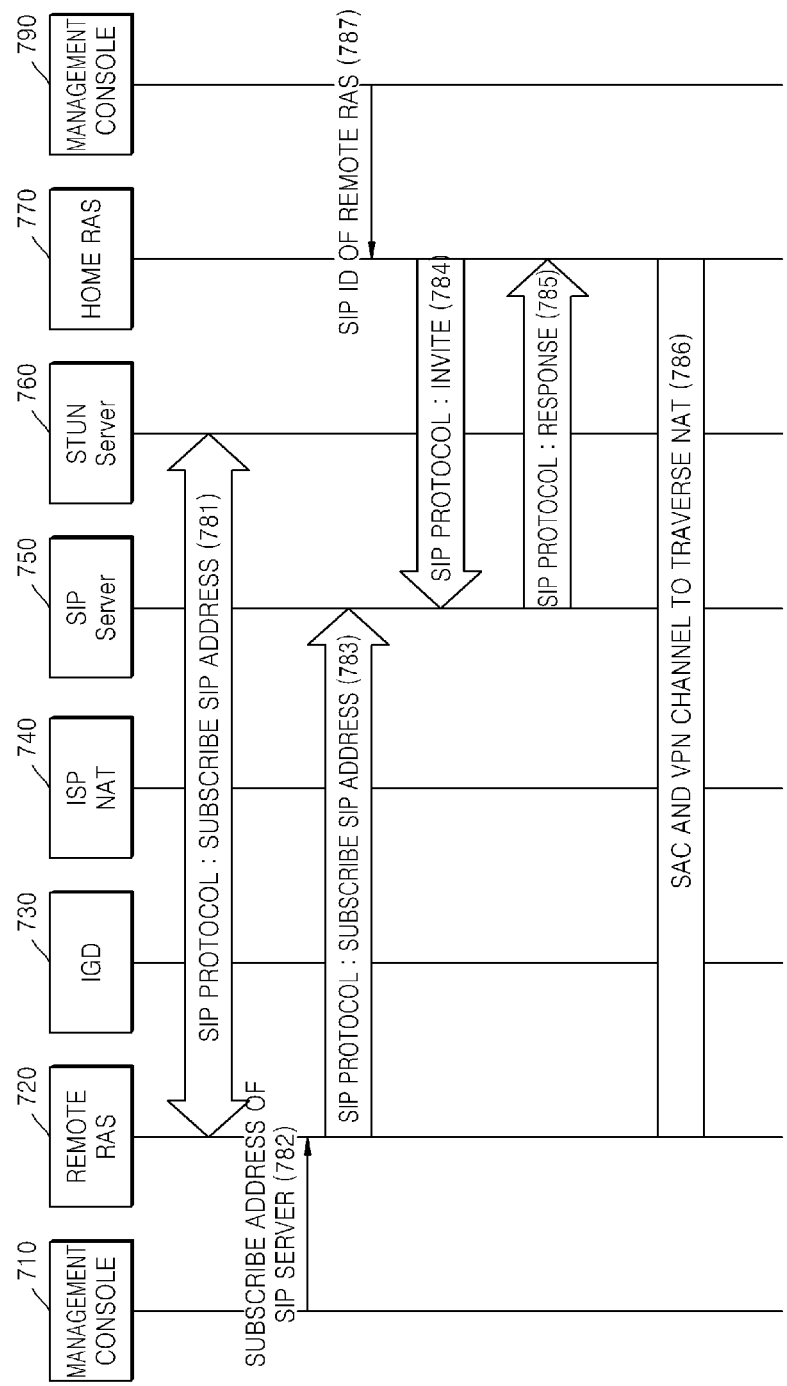
FIG. 7 is a diagram showing an exemplary process of traversing network address translation (NAT) by using a session initiation protocol (SIP).

FIG. 7 is a diagram showing an exemplary process of traversing NAT by using a SIP.

When a remote RAS 720 is in a NAT-based private network, the remote RAS 720 provides a NAT traversing address to a home RAS 770 in order to be accessed by the home RAS 770.

To this end, in operation 782, in the remote RAS 720, an address of a session initiation protocol (SIP) server 750 to which the NAT traversing address of the remote RAS 720 for a temporary SAC and a VPN channel (operation 786) has been subscribed, is subscribed to by a management console 710 of a network to which the remote RAS 720 belongs.

As described above, the NAT traversing address of the remote RAS 720 is a TA set, and a reflexive TA from among a TA, the reflexive TA, and a relaying TA may be obtained from a response to an inquiry to a STUN server (operation 781).

In operation 783, the remote RAS 720 subscribes its NAT traversing address in the SIP server 750 to the temporary SAC and the VPN channel (operation 786).

In operation 787, the home RAS 770 receives a SIP ID of the remote RAS 720 from a management console 790.

In operation 784, the home RAS 770 transmits a SIP invite message to the SIP server 750 so as to obtain the NAT traversing address of the remote RAS 720 corresponding to the SIP ID of the remote RAS 720.

In operation 785, the home RAS 770 receives a SIP response message from the SIP server 750 in response to the SIP invite message. The SIP response message includes the NAT traversing address of the remote RAS 720.

Meanwhile, when the home RAS 770 is in a NAT-based private network, the home RAS 770 loads its NAT traversing address into the SIP invite message to transmit the NAT traversing address to the SIP server 750.

Figure 8:
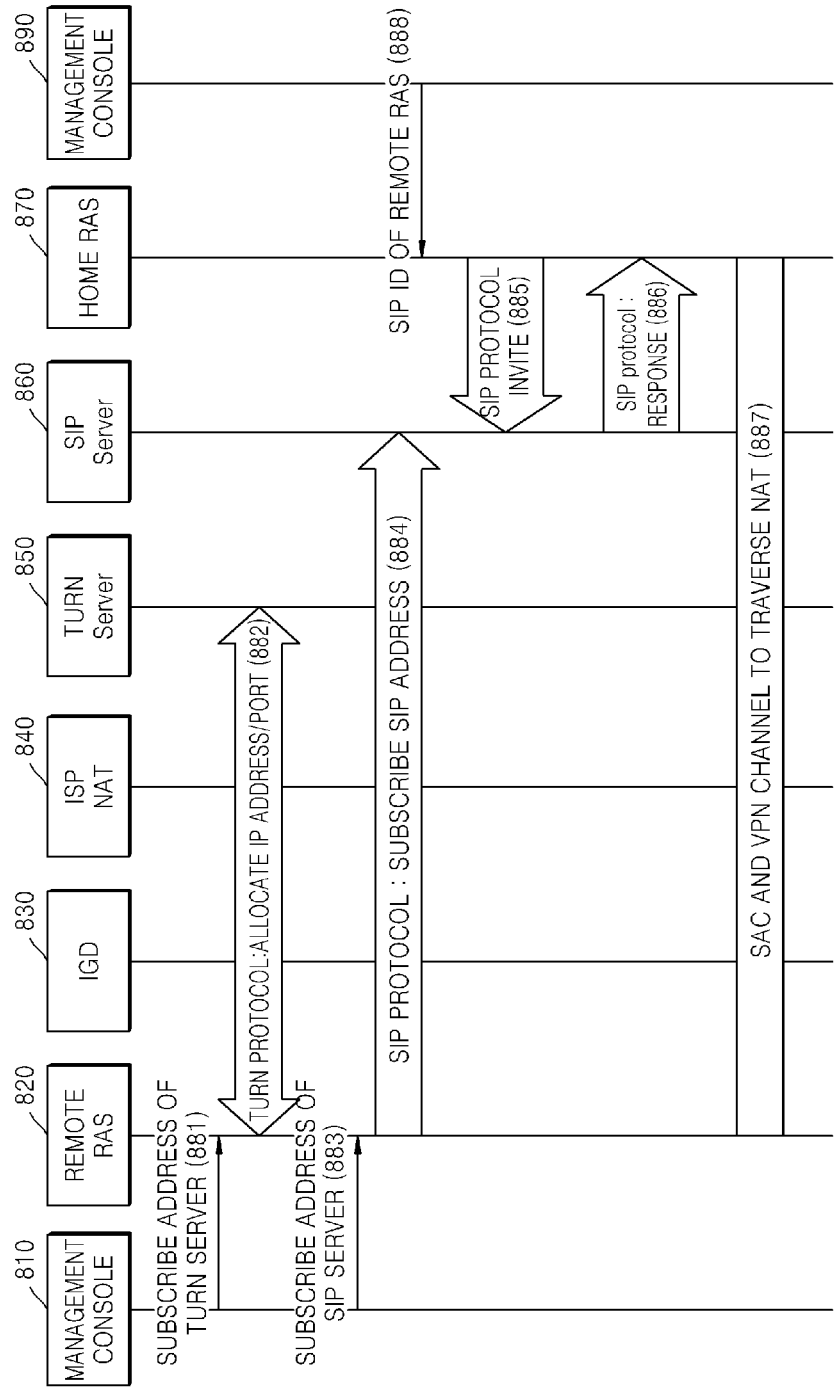
FIG. 8 is a diagram showing an exemplary process of traversing NAT, provided by a traversal using relays around NAT (TURN) server, by using a SIP.

FIG. 8 is a diagram showing an exemplary process of traversing NAT, provided by a TURN server 850, by using a SIP.

In operation 881, when a NAT traversing service is provided by the TURN server 850 to a remote RAS 820, in the remote RAS 820, an address of the TURN server 850 corresponding to the NAT traversing service is subscribed to a management console 810 of a network to which the remote RAS 820 belongs.

In operation 882, a relaying TA among a TA set corresponding to the NAT traversing address is allocated to the remote RAS 820 by using a TURN protocol. A relaying TA includes, when the remote RAS 820 is in a NAT-based private network and packets destined for the private network are relayed by the TURN server 850, a pair of a public IP address allocated to the TURN server 850 and a port number of a service to access.

In operation 883, in the remote RAS 820, an address of a SIP server 860 to which the NAT traversing address of the remote RAS 820 for a temporary SAC and a VPN channel (operation 887) has been subscribed, is subscribed to by a management console 810 of a network to which the remote RAS 820 belongs.

In operation 884, the remote RAS 820 subscribes its NAT traversing address to the temporary SAC and the VPN channel (operation 887) in the SIP server 860.

In operation 888, the home RAS 870 receives a SIP ID of the remote RAS 820 from a management console 890.

In operation 885, the home RAS 870 transmits a SIP invite message to the SIP server 860 so as to obtain the NAT traversing address of the remote RAS 820 corresponding to the SIP ID of the remote RAS 820.

In operation 886, the home RAS 870 receives a SIP response message from the SIP server 860 in response to the SIP invite message. The SIP response message includes the NAT traversing address of the remote RAS 820.

Figure 9:
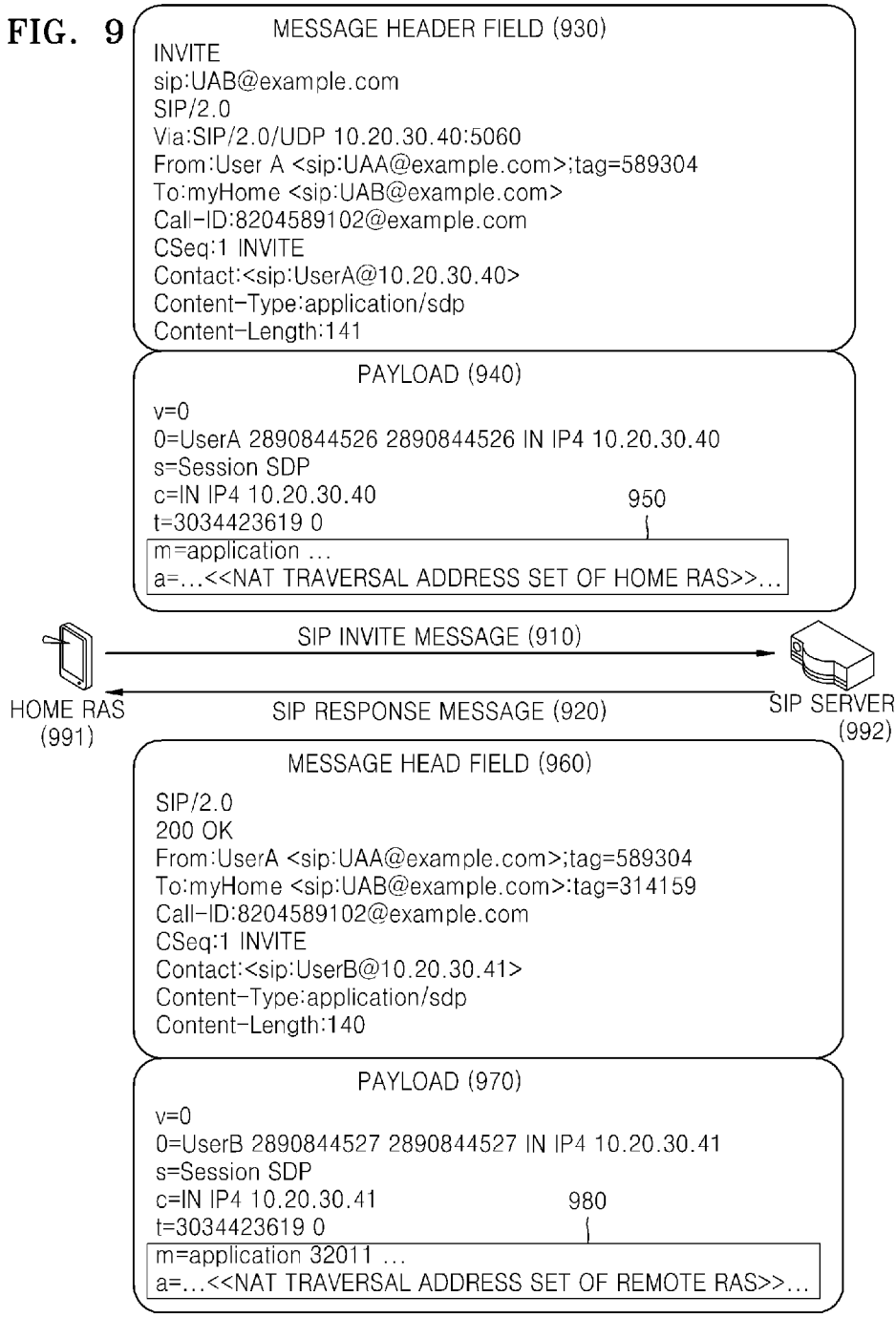
FIG. 9 is a diagram showing an exemplary process of transmitting address information for setting a secure authenticated channel (SAC) and a virtual private network (VPN), which traverse NAT, by using a SIP and a format for describing a set of NAT traversing addresses using a session description protocol (SDP).

FIG. 9 is a diagram showing an exemplary process of transmitting address information for setting a SAC and a VPN, which traverse NAT, by using a SIP and a format for describing a set of NAT traversing addresses using a session description protocol (SDP).

In operation 910, a home RAS 991 describes information about a TA set corresponding to its NAT traversing address by using a SDP and transmits the information in the form of a SIP invite message. Referring to FIG. 9, fields of the information about a TA set corresponding to the NAT traversing address are encoded in the SDP format.

In operation 920, the home RAS 991 receives the information about the TA set corresponding to the NAT traversing address with respect to a remote RAS (not shown) from a SIP server 992. Referring to FIG. 9, fields of the information about the TA set corresponding to the NAT traversing address are encoded in the SDP format.

Meanwhile, although not shown, the information about the TA set corresponding to the NAT traversing address may become payloads of a SIP packet in an extensible markup language (XML) format and may be transmitted to or received from the SIP server 992.

Figure 10:
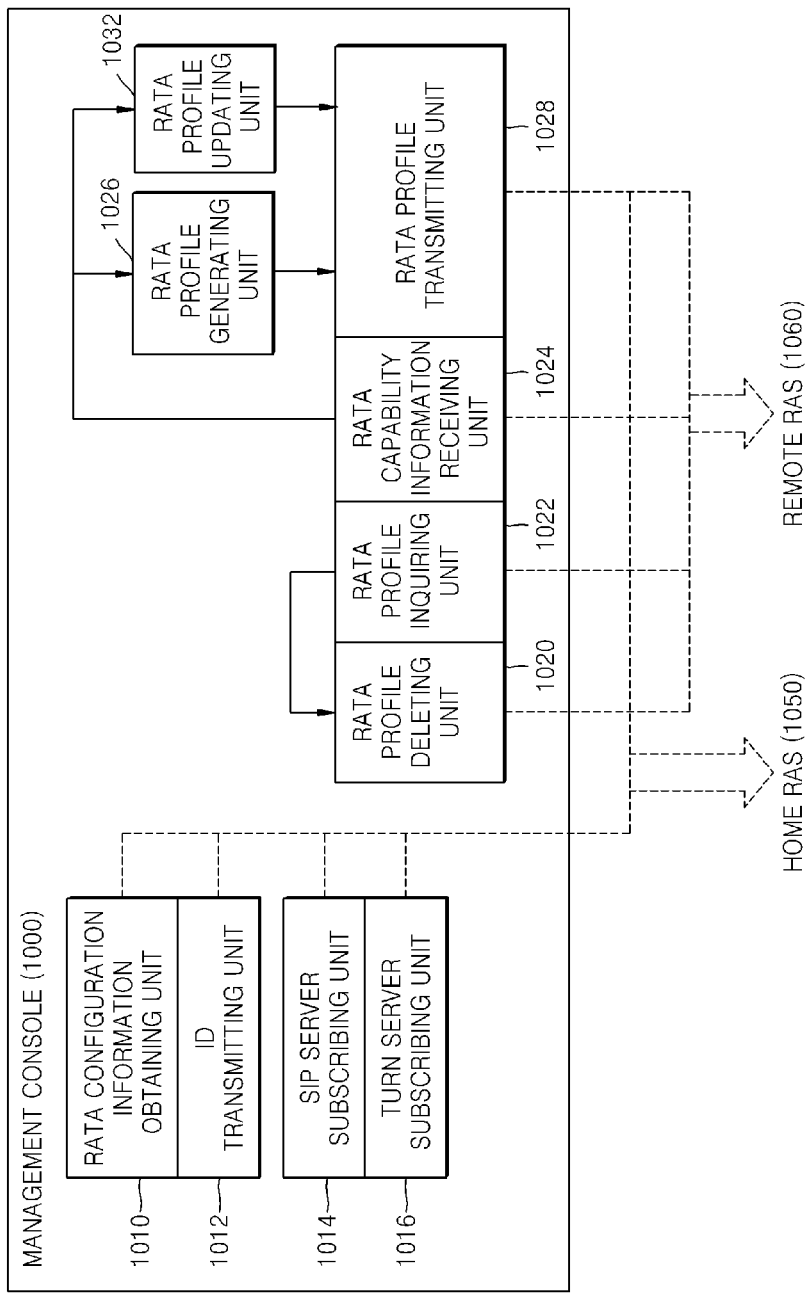
FIG. 10 is a block diagram illustrating the structure of an exemplary management console.

FIG. 10 shows the structure of an exemplary management console 1000. Referring to FIG. 10, the management console 1000 includes a RATA configuration information obtaining unit 1010, an identifier (ID) transmitting unit 1012, a SIP server subscribing unit 1014, a TURN server subscribing unit 1016, a RATA profile deleting unit 1020, a RATA profile inquiring unit 1022, a RATA capability information receiving unit 1024, a RATA profile generating unit 1026, a RATA profile transmitting unit 1028, and a RATA profile updating unit 1032.

The ID transmitting unit 1012 transmits an ID of a remote RAS 1060 to a home RAS 1050, wherein the ID of the remote RAS 1060 is used for setting a SAC destined for the remote RAS 1060 by using the home RAS 1050. Also, the ID transmitting unit 1012, when the remote RAS 1060 is in a NAT-based private network, transmits a SIP ID of the remote RAS 1060 to the home RAS 1050 so that a NAT traversing address by which the home RAS 1050 accesses to the remote RAS 1060, may be obtained.

The RATA capability information receiving unit 1024 transmits a message regarding an inquiry about RATA capability information of the home RAS 1050 and the remote RAS 1060 to the home RAS 1050 and the remote RAS 1060, respectively, and receives RATA capability information from each of the home RAS 1050 and the remote RAS 1060.

The RATA profile generating unit 1026 generates a credential based on the RATA capability information that are supported by the home RAS 1050 and the remote RAS 1060 and generates a RATA profile of each of the home RAS 1050 and the remote RAS 1060 based on the credential.

The RATA profile transmitting unit 1028 transmits the RATA profile, which is generated for remote access, to the home RAS 1050 and the remote RAS 1060, respectively.

The RATA configuration information obtaining unit 1010 obtains RATA configuration information including a credential and a RATA profile of the remote RAS 1060 from the home RAS 1050. For example, in RA Architecture 1.0, RATA Config Service information is not provided via a VPN. The RATA Config Service information may be provided to the home RAS 1050 via a RADA Sync service so that a management console of another network can update or delete an existing RATA profile.

The RATA profile updating unit 1032 updates a RATA profile to be remotely accessed based on the RATA capability information of the home RAS 1050 and the remote RAS 1060, which are received by the RATA capability information receiving unit 1124.

The RATA profile inquiring unit 1022 transmits a message regarding an inquiry to a RATA profile of each of the home RAS 1050 and the remote RAS 1060 to the home RAS 1050 and the remote RAS 1060, respectively.

The RATA profile deleting unit 1020 transmits a message for deleting the inquired RATA profile to the home RAS 1050 and the remote RAS 1060, respectively.

The SIP server subscribing unit 1014, when the management console 1000 is in a NAT-based private network, transmits an address of a SIP server to which a RAS of the private network subscribes a public address to traverse NAT, to the RAS of the private network.

The TURN server subscribing unit 1016, when the management console 1000 is in a NAT-based private network and a relaying service to traverse NAT is provided to the private network via a TURN server, transmits an address of the TURN server, which is subscribed to by a RAS of the private network, to the RAS of the private network.

The RATA capability information receiving unit 1024 and the RATA profile inquiring unit 1022 receive the RATA capability information and the RATA profile from the home RAS 1050 by using a UPnP action, and the ID transmitting unit 1012, the RATA profile transmitting unit 1028, and the RATA profile deleting unit 1020 transmit an ID and a SIP ID of the remote RAS 1060, the RATA profile, and the message for deleting the RATA profile to the home RAS 1050 by using the UPnP action.

The RATA capability information receiving unit 1024 and the RATA profile inquiring unit 1022 receive the RATA capability information and the RATA profile from the remote RAS 1060 on a SAC by using an out-of-band protocol, and the RATA profile transmitting unit 1028 and the RATA profile deleting unit 1020 transmit the RATA profile and the message for deleting the RATA profile to the remote RAS 1060 on the SAC by using the out-of-band protocol. The out-of-band protocol includes HTTP and S-HTTP.

When the management console 1000 moves to a remote network, the RATA capability information receiving unit 1024 and the RATA profile inquiring unit 1022 receive the RATA capability information and the RATA profile from the home RAS 1050 by using the UPnP action through remote access, and the ID transmitting unit 1012, the RATA profile transmitting unit 1028, and the RATA profile deleting unit 1020 transmit the SIP ID of the remote RAS 1060, the RATA profile, and the message for deleting the RATA profile to the home RAS 1050 by using the UPnP action through remote access.

Also, when the management console 1000 moves to the remote network, the RATA capability information receiving unit 1024 and the RATA profile inquiring unit 1022 discover the remote RAS 1060 and then receive the RATA capability information and the RATA profile from the remote RAS 1060 by using the UPnP action, and the RATA profile transmitting unit 1028 and the RATA profile deleting unit 1020 discover the remote RAS 1060 and then transmit the RATA profile and the message for deleting the RATA profile to the remote RAS 1060 by using the UPnP action.

Thus, when the management console 1000 moves to the remote network, an additional out-of-band protocol may not be required for transmitting the RATA profile to the remote RAS 1060 by using the management console 1000.

Figure 11:
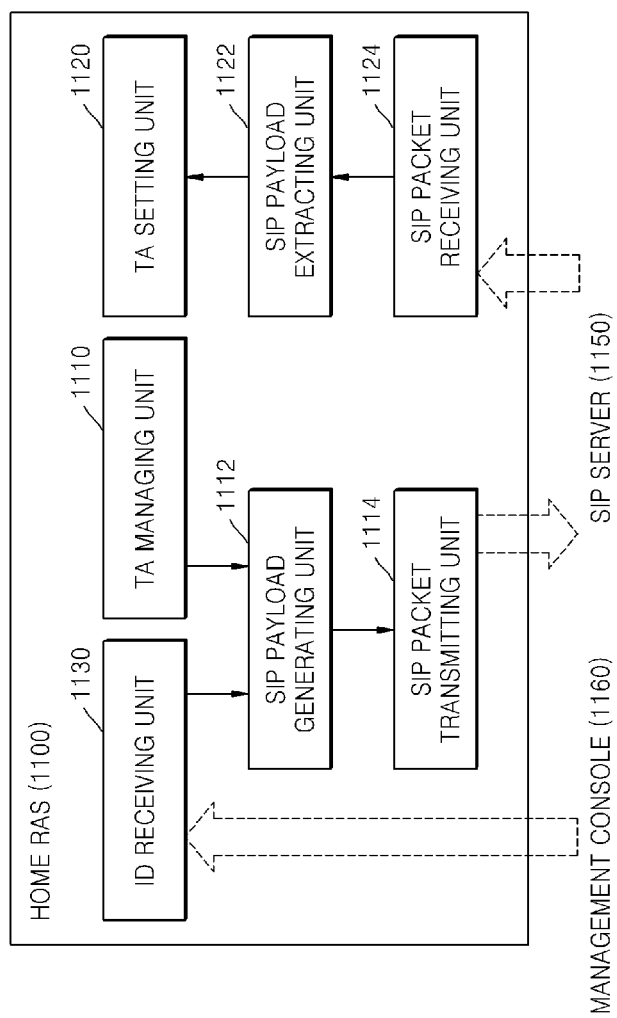
FIG. 11 is a block diagram illustrating the structure of an exemplary home RAS.

FIG. 11 shows the structure of an exemplary home RAS 1100. Referring to FIG. 11, the home RAS 1100 includes a TA managing unit 1110, a SIP payload generating unit 1112, a SIP packet transmitting unit 1114, a TA setting unit 1120, a SIP payload extracting unit 1122, a SIP packet receiving unit 1124, and an ID receiving unit 1130.

The ID receiving unit 1130 receives an ID of a remote RAS from a management console 1160, where the ID of the remote RAS is used for setting a SAC destined for the remote RAS by using the home RAS 1100. Also, the ID receiving unit 1130, when the remote RAS is in a NAT-based private network, receives a SIP ID of the remote RAS from the management console 1160 so that a NAT traversing address by which the home RAS is accessed by the remote RAS, can be obtained.

The TA managing unit 1110, when the home RAS 1100 is in a NAT-based private network, generates TA set information corresponding to candidate IP addresses to access the home RAS 1100.

The SIP payload generating unit 1112 generates a payload of a SIP packet including the TA set information corresponding to the candidate IP addresses to access the home RAS 1100. The payload of the SIP packet may be in the form of XML or SDP. In other implementations, the payload of the SIP packet is in a form other than XML or SDP.

The SIP packet transmitting unit 1114 transmits the SIP packet to the SIP server 1150. The SIP packet receiving unit 1124 receives the SIP packet including the TA set information corresponding to the candidate IP addresses to access the remote RAS as the payload of the SIP packet, from the SIP server. The SIP payload extracting unit 1122 extracts the payload including the TA set information of the remote RAS from the SIP packet. The TA setting unit 1120 sets the TA set information of the remote RAS within the home RAS 1100.

According to example(s) described above, there is provided a method and apparatus for providing a remote access service to a universal plug and play (UPnP) remote access server (RAS) and a UPnP remote access client (RAC) in a remote network by setting channel setting information (a remote access transport agent (RATA) profile) for remote access and traversing network address translation (NAT).

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of providing a remote access service by using a first device, comprising:
    receiving a session initiation protocol (SIP) identifier (ID) of a second device from a control device;
    generating a payload of an SIP packet comprising the SIP ID of the second device and address set information of the first device corresponding to candidate Internet protocol (IP) addresses to access the first device;
    receiving another SIP packet comprising address set information of the second device corresponding to the candidate IP addresses to access the second device corresponding to the SIP ID of the second device as a payload of the other SIP packet;
    extracting the payload comprising the address set information of the second device from the other SIP packet,
    wherein, in response to the second device being included in a network address translation (NAT)-based private network, the address set information of the second device comprises a reflexive transport address (TA),
    in response to the second device receiving a NAT traversing service from a traversal using relays around NAT (TURN) server, the address set information of the second device comprises a relaying TA, and
    in response to the second device not being included in the NAT-based private network, the address set information of the second device comprises a TA; and
    setting address information of the second device.

2. The method of claim 1, wherein the address set information of the first device comprises another TA, another reflexive TA, and another relaying TA, the other TA comprises a pair of IP addresses allocated to the first device and a port number of a service to access, the other reflexive TA comprises, upon the first device being in the NAT-based private network, a pair of public IP addresses allocated to the private network and a port number of a service to access, and the other relaying TA comprises, upon the first device being in the NAT-based private network and packets destined for the private network are relayed by the TURN server, a pair of public IP addresses allocated to the TURN server and a port number of a service to access.

3. The method of claim 1, wherein the TA comprises a pair of IP addresses allocated to the second device and a port number of a service to access, the reflexive TA comprises, when the second device is in the NAT-based private network, a pair of public IP addresses allocated to the private network and a port number of a service to access, and the relaying TA comprises, when the second device is in the NAT-based private network and packets destined for the private network are relayed by the TURN server, a pair of public IP addresses allocated to the TURN server and a port number of a service to access.

4. The method of claim 1, further comprising generating address set information corresponding to the candidate IP addresses to access the first device.

5. The method of claim 1, wherein the payload of the SIP packet is in a form of extensible markup language (XML) or session description protocol (SDP).

6. The method of claim 1, wherein the second device is a client device or a server.

7. A first device, comprising:
    an identifier (ID) receiving device configured to receive a session initiation protocol (SIP) ID of a second device from a control device;
    an SIP payload generating device configured to generate a payload of an SIP packet comprising the SIP ID of the second device and address set information of the first device corresponding to candidate Internet protocols (IP) addresses to access the first device;
    an SIP packet receiving device configured to receive another SIP packet comprising address set information of the second device corresponding to the candidate IP addresses to access the second device corresponding to the SIP ID of the second device as a payload of the other SIP packet;
    an SIP payload extracting device configured to extract the payload comprising the address set information of the second device from the other SIP packet,
    wherein, in response to the second device being included in a network address translation (NAT)-based private network, the address set information of the second device comprises a reflexive transport address (TA),
    in response to the second device receiving a NAT traversing service from a traversal using relays around NAT (TURN) server, the address set information of the second device comprises a relaying TA, and
    in response to the second device not being included in the NAT-based private network, the address set information of the second device comprises a TA; and
    an address controlling device configured to set address set information of the second device.

8. The first device of claim 7, wherein the address set information of the first device comprises another TA, another reflexive TA, and another relaying TA, the other TA comprises a pair of IP addresses allocated to the first device and a port number of a service to access, the other reflexive TA comprises, upon the first device being in the NAT-based private network, a pair of public IP addresses allocated to the private network and a port number of a service to access, and the other relaying TA comprises, upon the first device being in the NAT-based private network and packets destined for the private network are relayed by the TURN server, a pair of a public IP address allocated to the TURN server and a port number of a service to access.

9. The first device of claim 7, wherein the TA comprises a pair of IP addresses allocated to the second device and a port number of a service to access, the reflexive TA comprises, when the second device is in the NAT-based private network, a pair of public IP addresses allocated to the private network and a port number of a service to access, and the relaying TA comprises, when the remote in the NAT-based private network and packets destined for the private network are relayed by the TURN server, a pair of public IP addresses allocated to the TURN server and a port number of a service to access.

10. The first device of claim 7, further comprising an address managing device configured to generate address set information corresponding to the candidate IP addresses to access the first device.

11. The first device of claim 7, wherein the payload of the SIP packet is in a form of extensible markup language (XML) or session description protocol (SDP).

12. The first device of claim 7, wherein the second device is a client device or a server.

13. A non-transitory computer-readable storage medium storing instructions that, when executed by one or more processors, cause the one or more processors to perform a method to provide a remote access service by using a first device, the method comprising:
   receive a session initiation protocol (SIP) identifier (ID) of a second device from a control device;
   generate a payload of an SIP packet comprising the SIP ID of the second device and address set information of the first device corresponding to candidate Internet protocol (IP) addresses to access the first device;
   receive another SIP packet comprising the address set information of the second device corresponding to the candidate IP addresses to access the second device corresponding to the SIP ID of the second device as a payload of the other SIP packet;
   extract the payload comprising the address set information of the second device from the other SIP packet,
   wherein, in response to the second device being included in a network address translation (NAT)-based private network, the address set information of the second device comprises a reflexive transport address (TA),
   in response to the second device receiving a NAT traversing service from a traversal using relays around NAT (TURN) server, the address set information of the second device comprises a relaying TA, and
   in response to the second device not being included in the NAT-based private network, the address set information of the second device comprises a TA; and
   set address information of the second device.

14. A non-transitory computer-readable medium storing instructions that, when executed by one or more processors, cause the one or more processors to perform the method of claim 1.

* * * * *